US005113306A

United States Patent [19]

Veverka et al.

[11] Patent Number: 5,113,306

[45] **Date of Patent: * May 12, 1992**

[54] NON-FRAGMENTING ARRESTER WITH STAGED PRESSURE RELIEF MECHANISM

[75] Inventors: Edward F. Veverka; Gary L. Goedde, both of Racine; John F. Baranowski, Franklin, all of Wis.; Stanley S. Kershaw, Jr., Portville, N.Y.

[73] Assignee: Cooper Power Systems, Inc., Coraopolis, Pa.

[ * ] Notice: The portion of the term of this patent subsequent to May 29, 2007 has been disclaimed.

[21] Appl. No.: 436,352

[22] Filed: Nov. 14, 1989

Related U.S. Application Data

[63] Continuation-in-part of Ser. No. 339,577, Apr. 18, 1989, Pat. No. 4,930,039.

[51] Int. Cl.[5] .................... H02H 9/04

[52] U.S. Cl. .................... 361/127; 361/117

[58] Field of Search .................... 361/117, 118, 124, 126, 361/127, 125, 120; 313/231.11

[56] References Cited

U.S. PATENT DOCUMENTS

| | | | |
|---|---|---|---|
| 3,155,874 | 11/1964 | Sorrow et al. | 315/36 |
| 3,727,108 | 4/1973 | Westrom | 317/68 |
| 4,001,651 | 1/1977 | Kershaw, Jr. | 317/61 |
| 4,161,012 | 7/1979 | Cunningham | 361/128 |
| 4,240,124 | 12/1980 | Westrom | 361/127 |
| 4,276,578 | 6/1981 | Levinson et al. | 361/127 |
| 4,282,557 | 10/1981 | Stetson | 361/117 |
| 4,298,900 | 11/1981 | Avdeenko et al. | 361/127 |
| 4,335,417 | 6/1982 | Sakshaug et al. | 361/127 |
| 4,404,614 | 9/1983 | Koch et al. | 361/128 |
| 4,587,592 | 5/1986 | Nakano et al. | 361/127 |
| 4,656,555 | 4/1987 | Raudabaugh | 361/117 |
| 4,686,603 | 8/1987 | Mosele | 361/118 |
| 4,743,996 | 5/1988 | Book | 361/39 |
| 4,910,632 | 3/1990 | Shiga et al. | 361/127 |
| 4,930,039 | 5/1990 | Woodworth et al. | 361/127 |

FOREIGN PATENT DOCUMENTS 0335480 10/1989 European Pat. Off. .

OTHER PUBLICATIONS

Ohio Brass Catalog 94: PDV-65 and PDV-100 Distribution Class Surge Arresters.

*Primary Examiner*—Todd E. DeBoer

*Attorney, Agent, or Firm*—Gregory L. Maag; David A. Rose

[57] ABSTRACT

A non-fragmenting surge arrester with a staged pressure relief mechanism includes a liner with outlets formed in the walls thereof, a gas expansion chamber within the liner and a housing having weakened-wall regions adjacent to the outlets in the liner. Ionized gas formed by an internal failure is vented from the expansion chamber through the outlets and, upon generation of sufficient pressure, fractures the housing at the weakened-wall regions. In this manner, the generated gas forms a lower impedance path for the current which is thereby shunted around the failed internal components, preventing the generation of further internal pressure which could cause a catastrophic failure of the arrester.

44 Claims, 4 Drawing Sheets

NON-FRAGMENTING ARRESTER WITH STAGED PRESSURE RELIEF MECHANISM

RELATED APPLICATION

This application is a continuation-in-part of co-pending U.S. patent application, Ser. No. 07/339,577, filed Apr. 18, 1989.

BACKGROUND OF THE INVENTION

The present invention relates generally to apparatus for protecting electrical equipment from damage or destruction due to the presence of electrical overvoltages, such apparatus commonly referred to as a surge arrester. More particularly, the invention relates to a non-fragmenting, surge arrester. Still more particularly, the invention relates to an elastomer housed distribution arrester having a staged pressure relief system which, in the unlikely event of failure, safely vents ionized gases generated by internal arcing outside the arrester, thereby preventing what otherwise could be a catastrophic failure of the arrester.

A surge arrester is commonly connected in parallel with a comparatively expensive piece of electrical equipment in order to shunt overvoltage surges, such as those caused by lightning strikes, to ground, thereby protecting the equipment and circuit from damage or destruction. A modern surge arrester typically includes an elongated enclosure made of an electrically insulating material, a series of voltage dependent nonlinear resistive elements retained within the housing, and a pair of electrical terminals at opposite ends of the housing for connecting the arrester between line and ground. The voltage dependent nonlinear resistive elements employed are typically, but not restricted to, metal oxide varistor elements formed into relatively short cylindrical disks which are stacked one atop the other within the enclosure. Other shapes and configurations may also be used for the varistor elements. The varistor elements provide either a high or a low impedance current path between the arrester terminals depending on the voltage appearing across the varistor elements themselves. More specifically, at the power system's steady state or normal operating voltage, the varistor elements have a relatively high impedance. As the applied voltage is increased, gradually or abruptly, the varistor elements' impedance progressively decreases until the voltage appearing across the varistors reaches the elements' breakdown voltage, at which point their impedance dramatically decreases and the varistor elements become highly conductive. Accordingly, if the arrester is subjected to an abnormally high transient overvoltage, such as resulting from a lightning strike or power frequency overvoltage for example, the varistor elements become highly conductive and serve to conduct the resulting transient current to ground. As the transient overvoltage and resultant current dissipate, the varistor elements' impedance once again increases, restoring the arrester and electrical system to their normal, steady-state condition.

Occasionally, the transient condition may cause some degree of damage to one or more of the varistor elements. Damage of sufficient severity can result in arcing within the arrester enclosure, leading to extreme heat generation and gas evolution as the internal components in contact with the arc are vaporized. This gas evolution causes the pressure within the arrester to increase rapidly until it is relieved by either a pressure relief means or by the rupture of the arrester enclosure. The failure mode of arresters under such conditions may include the expulsion of components or component fragments in all directions. Such failures pose potential risks to personnel and equipment in the vicinity. Equipment may be especially at risk when the arrester is housed within the equipment it is meant to protect, as in the tank of a transformer for example.

Attempts have been made to design and construct arresters which will not catastrophically fail with the expulsion of components or component fragments. One such arrester is described in U.S. Pat. No. 4,404,614 which discloses an arrester having a non-fragmenting liner and outer housing, and a pressure relief diaphragm located at its lower end. A shatterproof arrester housing is also disclosed in U.S. Pat. No. 4,656,555. Arresters having pressure relief means formed in their ends for venting ionized gas in a longitudinal direction are described in U.S. Pat. Nos. 3,727,108, 4,001,651 and 4,240,124.

Despite such advances, however, state of the art arresters may still fail with expulsion of components or fragments of components. This may in part be due to the fact that once the internal components in these arresters fail, the resulting arc vaporizes the components and generates gas at a rate that can not be vented quickly enough to prevent rupture of the arrester. Accordingly, there exists a need in the art for an arrester which, upon failure, will fail in a non-fragmenting manner. Preferably, such an arrester would eliminate the possibility of catastrophic failures by transferring the failure-causing arc away from the internal components, thereby preventing the generation of any additional pressure. One means by which this may be accomplished is to design an improved arrester which would safely vent the ionized gases formed by the internal arc outside the arrester, thereby forming a lower impedance path to ground for the arc. It is further desirable that such an improved arrester would vent the gases in a staged or controlled manner so as to prevent fracturing the arrester by an abrupt change in internal arrester pressure.

SUMMARY OF THE INVENTION

Provided herein is a non-fragmenting surge arrester having a staged pressure relief system that is structured to safely vent ionized gases formed by an internal arc outside the arrester and thereby prevent catastrophic arrester failures. The arrester of the present invention includes a shatterproof, insulative housing, a rigid liner within the housing for retaining the operative components of the arrester in a fixed relationship, and one or more vents or outlets formed in the liner for venting gases therethrough. The outlets may comprise one or more elongate slots or slits formed in the wall of the liner. alternatively, the outlets may include an array of such slots or slits or one or more rows of aligned perforations formed parallel to the axis of the liner.

In addition to these outlets, the invention employs thin or weakened-wall segments formed within the housing as part of the pressure relief system. In the preferred embodiment, the thin wall segments are positioned adjacent to the outlets in the liner. In this configuration, gas vented from within the liner through the outlets will break through the housing at designed locations. The thin or weakened-wall segments may comprise a number of discrete weakened segments aligned parallel to the housing's axis, such as may be formed between the rain skirts or ribs of the housing, or may instead comprise a continuous longitudinal channel formed in the housing.

The invention further includes an expansion chamber within the liner as part of its pressure relief system. The chamber is defined by the inner surface of the liner and the surface of the electrical components contained therein, such components typically comprising metal oxide varistors. The position of the varistors is maintained within the liner by insulative standoffs that are positioned between the varistors and the liner. The volume of the chamber acts as a buffer and momentarily lessens the forces that would otherwise be applied to the inside of the liner during an arrester failure so as to allow the generated gas to be safely vented through the liner outlets and the weakenedwall segments of the housing without fracturing the liner.

Thus, the present invention comprises a combination of features and advantages which enable it to substantially advance arrester technology by providing a non-fragmenting, and thus fail-safe, arrester for use in a variety of insulating media. These and various other characteristics and advantages of the present invention will be readily apparent to those skilled in the art upon reading the following detailed description and referring to the accompanying drawings.

BRIEF DESCRIPTION OF THE DRAWINGS

For an introduction to the detailed description of the preferred embodiment of the invention, reference will now be made to the accompanying drawings, wherein.

DESCRIPTION OF THE PREFERRED EMBODIMENT

Surge arresters are installed in electrical systems for the purpose of diverting dangerous overvoltage surges to ground before such surges can damage expensive electrical equipment. Even current, state-of-the-art arresters will sometimes fail, however, and may fail in catastrophic, explosive fashion. When a catastrophic failure occurs, shrapnel-like arrester fragments may damage equipment and endanger personnel. Thus, it is desirable that a surge arrester be designed and constructed to have a predictable, controlled, and non-fragmenting failure mode.

Figure 1:
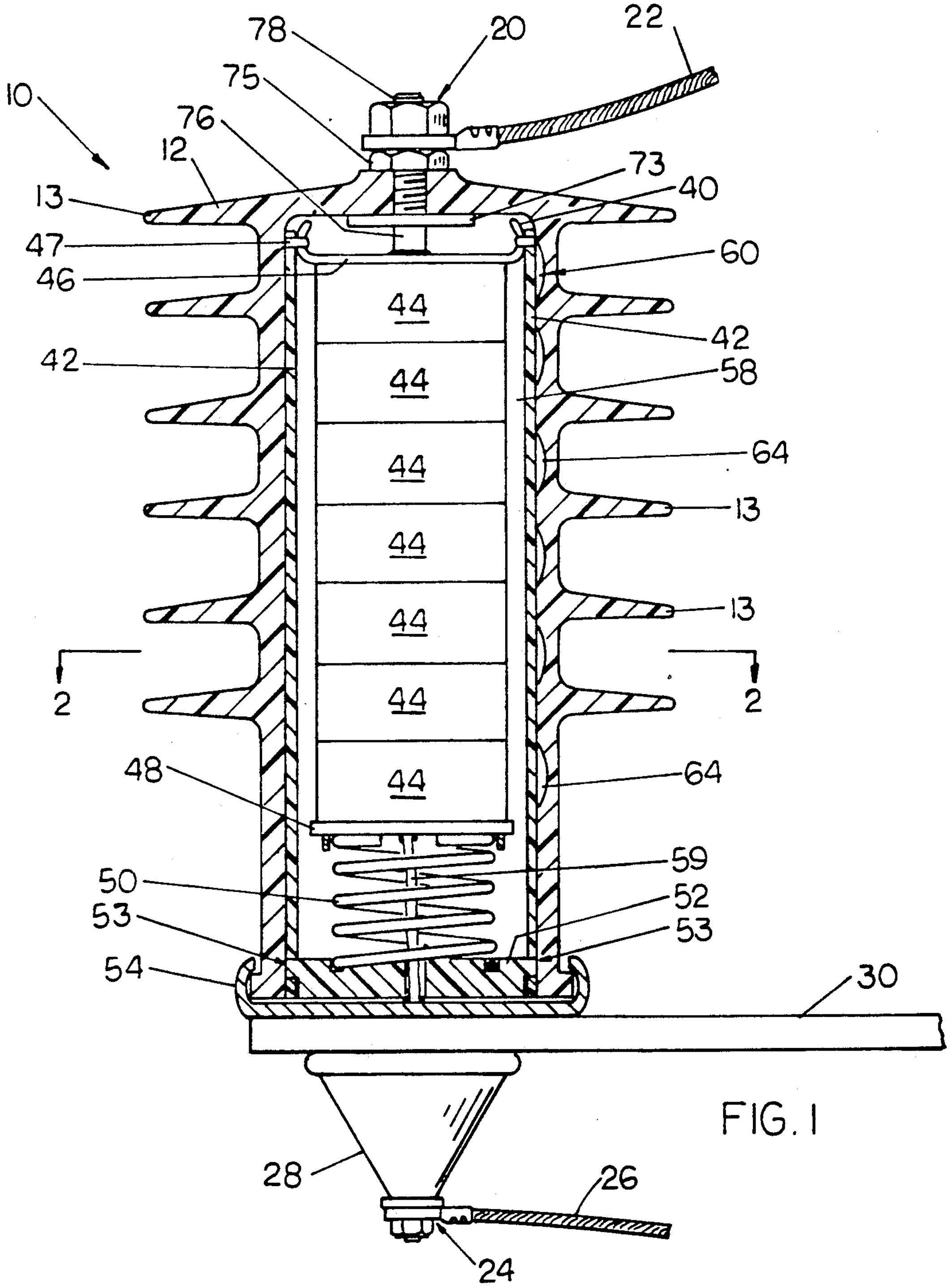
FIG. 1 shows an elevation view, partly in cross section, of the surge arrester of the present invention.

Referring initially to FIG. 1, there is shown a non-fragmenting surge arrester 10 structured in accordance with the principles of the present invention. Arrester 10 generally comprises an insulative and protective housing 12, an inner arrester subassembly 40, a pressure relief system 60 and line and ground terminals 20 and 24, respectively. Housing 12 is made of a non-fragmenting, shatterproof material and physically covers, protects and electrically insulates the subassembly 40. Subassembly 40, in turn, houses the operative components of arrester 10 and, together with housing 12, forms pressure relief system 60. Terminals 20 and 24 electrically connect arrester 10 between a line voltage and ground.

It is preferred that housing 12 be made from elastomeric materials such as ethylene propylene based monomers or silicone based rubbers, silicone based rubbers being currently preferred. These materials are shatterproof and provide superior outdoor insulating properties, although other polymeric materials may be employed. Housing 12 substantially envelopes and houses subassembly 40 and hermetically seals subassembly 40 from the ambient environment. Housing 12, which includes spaced-apart rain skirts or ribs 13 formed about the length of housing 12, is sealingly attached to the lower end of subassembly 40 by a compression cap 54. Cap 54, which may be made of brass, copper or other conducting material, provides an axial clamping force when compressed about the lower end of housing 12 and seals housing 12 to the lower end of subassembly 40. At the top of arrester 10, housing 12 is sealed against stud 78 of line terminal 20 by washer 73 and nut 75. As shown in FIG. 1, stud 78, which includes a shoulder 76, is brazed to upper electrode 46. Washer 73 is seated on shoulder 76. In this configuration, when nut 75 is tightened, the elastomer of housing 12 is compressed between washers 73 and nut 75, thereby extruding housing 12 into sealing contact with stud 78.

Arrester 10 is supported by an insulative hanger 30, shown in FIG. 1, which preferably is manufactured of glass filled polyester, although other polymeric materials may be employed. A terminal stud (not shown) is brazed to cap 54 and extends through an aperture in hanger 30 and engages conventional ground lead disconnector 28, electrically connecting cap 54 to disconnector 28. Disconnector 28, also known as an isolator, is connected to ground terminal 24 and employed to physically disconnect the ground lead 26 from the arrester 10 by the ignition of an explosive charge when the disconnector 28 reaches a predetermined temperature. This may occur, for example, when the arrester 10 has failed to prevent the flow of the steady state, power-frequency current after a surge, and is therefore acting as a short circuit to ground.

Referring still to FIG. 1, subassembly 40 generally comprises subassembly sleeve or liner 42, non-linear resistors 44, and top and bottom electrodes 46 and 48, respectively. Liner 42 retains non-linear resistors 44, electrodes 46 and 48 and other components in a series or stacked relationship within subassembly 40 and provides rigidity to the arrester housing 12. Liner 42 is preferably an insulative conduit manufactured of fiberglass, although other insulative materials may be employed. Liner 42 may be tubular or have any of a number of other shaped cross sections. A tubular liner 42 having wall thickness of approximately 0.090 inches has proven satisfactory in many applications.

Non-linear resistors 44 are preferably metal oxide varistors that have been formed into short cylindrical blocks or disks. Varistors 44 are retained within liner 42 between top and bottom electrodes 46 and 48, which are made of brass, copper or other conductive material. Top electrode 46 forms a closure at the top of liner 42, and is attached to liner 42 for example by nylon pins 47. As shown in FIG. 1, a compression spring 50 is biased between bottom electrode 48 and a retaining yoke 52 which is formed of a fiberglass or other insulative or conductive material and positioned in slots 53 formed within liner 42. Bottom electrode 48, spring 50 and yoke 52 cooperate to provide an axial load against the stack of varistor elements 44 sufficient to maintain varistor elements 44 in intimate contact with one another and with electrodes 46 and 48, which is necessary for good electrical contact and for the arrester to function properly. A conductor 59 is electrically connected to bottom electrode 48 and to conducting cap 54 and completes the series circuit between line and ground terminals 20, 24, the circuit including top electrode 46, varistors 44 and bottom electrode 48. Although not shown, one or more conductive plates may be positioned between some or all of varistors 44 to serve as heat sinks and help dissipate heat generated within arrester 10 when dissipating surge energy and to provide a good conductive interface between varistors 44.

Pressure relief means 60, best described with reference to FIGS. 1 and 2, generally comprises an annular chamber 58, formed between varistors 44 and liner 42, outlets or ports 62 of liner 42, and weakened-wall regions or segments 64 of housing 12. Together, annular chamber 58, outlets 62 and weakened-wall regions 64 cooperate to provide for the controlled or staged relief of the internal pressure produced by an internal arc during an arrester failure.

Figure 2:
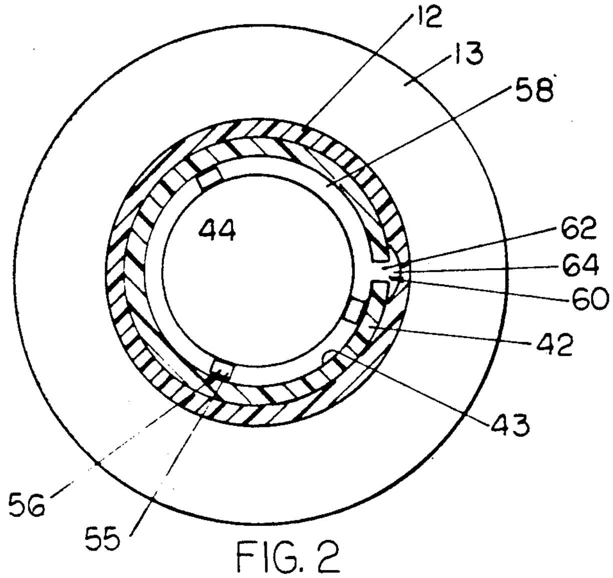
FIG. 2 shows a cross section of the surge arrester shown in FIG. 1 taken above line 2—2.

Annular chamber 58 is best shown in FIG. 2. As shown, varistors 44 have a diameter smaller than the inside diameter of liner 42. Varistors 44 are retained in a stacked relationship within liner 42 and are spaced apart from the walls 43 of liner 42 by insulative standoffs 56 which are positioned within subassembly 40 during manufacture. Insulative standoffs 56 may be, for example, elongate members 55 made from nylon or other insulative material and attached to liner 42 by any of a variety of insulating adhesives. In the preferred embodiment, varistors 44 are coaxially aligned and concentrically positioned within a tubular liner 42 and spaced apart from walls 43 of liner 42 by a gap ranging from 1/16 to ¼ inches depending upon the size and rating of the arrester. In this configuration, annular chamber 58 is formed between varistors 44 and liner 42. The volume of annular chamber 58 provides an expansion chamber within liner 42 to momentarily retain the ionized gas generated by an internal arc before the gas pressure is relieved outside the arrester 10.

Pressure relief means 60 further comprises one or more vents or outlets 62 formed in the walls 43 of liner 42. In the preferred embodiment as shown in FIG. 3, a single elongate outlet or slot 62 is formed through the entire length of liner 42; however, a variety of other configurations can be employed as described below. The outlet 62 should extend the length of the stack of varistors 44 to enable venting to occur along the entire axial length of the varistor stack.

Figure 8:
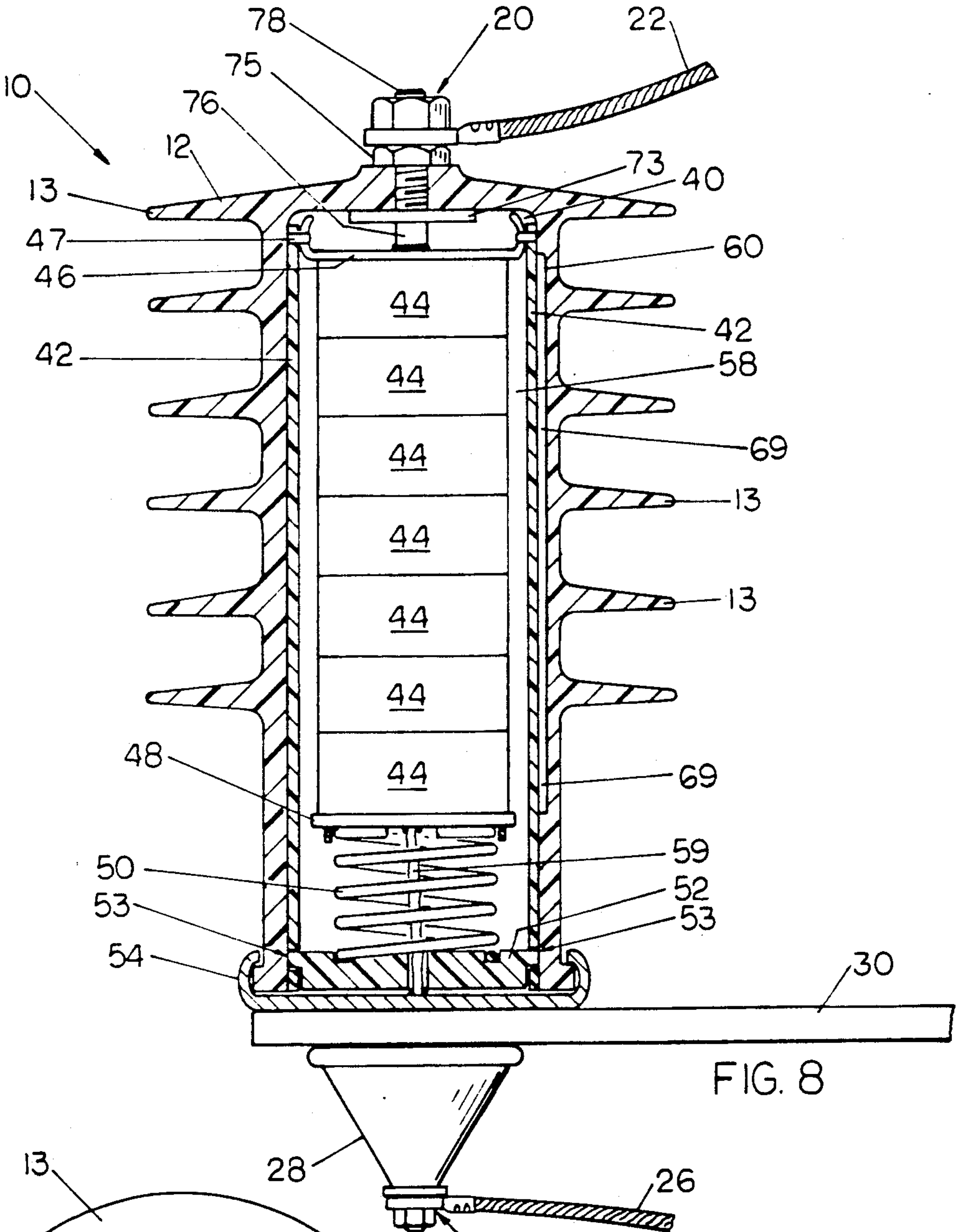
FIG. 8 shows an elevation view, in cross section, of the surge arrester shown in FIG. 7.
Figure 7:
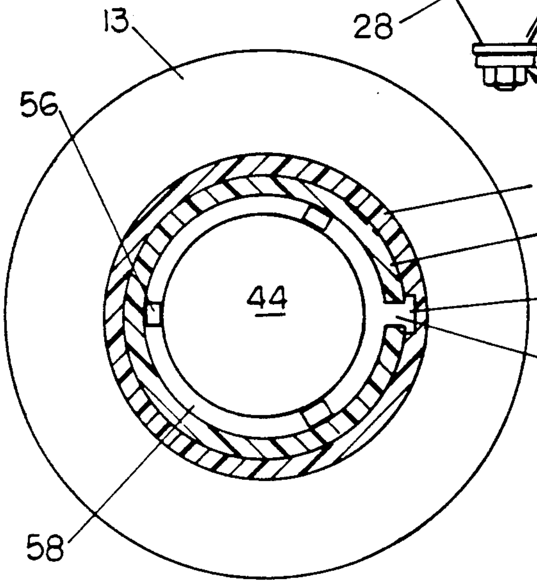
FIG. 7 shows, in a cross section, a further embodiment of the surge arrester shown in FIG. 1.

Referring again to FIGS. 1 and 2, pressure relief means 60 further comprises weakened or thin walled regions 64 formed in housing 12. Weakened-wall sections 64 may be molded or cut into housing 12. In the preferred embodiment, weakened-wall sections 64 are preferably formed along the inside of housing 12 between each skirt or rib 13. Housing 12 may have, for example, a wall thickness equal to approximately 0.15 inches and weakened-wall sections 64 formed within housing 12 to a depth of approximately one-half the wall thickness, in this example 0.075 inches, although other thicknesses of housing walls and weakened-wall sections may be employed. Weakened-wall sections 64 could likewise be formed on the outside of housing 12. By forming the weakened-wall sections 64 between ribs 13 and not reducing the thickness of the housing walls at ribs 13, the axial strength of housing 12 is not compromised and the radial or hoop strength of the housing is maintained at each rib location. As shown, weakened-wall sections 64 are aligned in housing 12 and positioned so as to be adjacent to outlet 62 formed in liner 42. Alternatively, as shown in FIG. 7 and FIG. 8, rather than having discrete weakened segments formed in housing 12 between ribs 13, housing 12 may employ a continuous longitudinal groove or channel 69 along the inside surface of housing 12, the channel having a length substantially equal to the height of the stack of varistors 44 and the length of outlet 62.

With reference to FIG. 1, the operation of arrester 10 will now be explained. In operation, the arrester 10 of the present invention is installed in parallel with the electrical equipment it is intended to protect by connecting line lead 22 to a power carrying conductor, and connecting ground lead 26 to ground. After installation, if any of the varistor elements 44 in arrester 10 should experience a dielectric breakdown or fail for other reasons during operation, the voltage which builds across the defective varistor element or elements 44 will cause an internal arc to form across the failed element or elements as the current continues to be conducted through the arrester. The arc, which may burn at a temperature of several thousand degrees, will vaporize the internal components of subassembly 40 that are in contact with the arc. As the arc continues to burn, a large volume of ionized gas is generated within subassembly 40. As described below, pressure relief means 60 radially vents the generated gas outside housing 12 in a controlled manner so as to prevent the violent failure of the arrester.

The ionized gas generated during an arrester failure first pressurizes annular chamber 58 which surrounds varistors 44. Annular chamber 58 provides an expansion chamber for the gas so as to reduce the shock that would otherwise be experienced by liner 42 if no such chamber were provided. After annular chamber 58 is pressurized, the ionized gas is vented in a radial direction through the walls 43 of liner 42 via the outlets 62. When the ionized gas is vented through the outlets 62, housing 12 may initially stretch to accommodate the increased volume but will then rupture along the weakened-wall regions 64 due to the increased internal pressure. Once housing 12 ruptures, the ionized gas, now outside arrester 10, forms a lower impedance path for the current than the parallel path existing inside subassembly 40. Thus, the current being conducted by arrester 10 diverts to the lower impedance alternate path formed by the ionized gas, and an external arc is formed around the failed internal elements. When this occurs, the internal arc is effectively transferred to the alternate path. Since the internal arc has been diverted from the failed elements, the generation of further pressure within arrester 10 is prevented. Annular chamber 58, outlets 62 and weakened-wall regions 64 limit the arrester's internal pressure to a pressure below the bursting pressure of the subassembly 40, thereby preventing any fracture of the arrester 10 and the expulsion of components or component fragments.

As arrester 10 is generally installed near electrical equipment or other structures, it is desirable to directionally vent the ionized gas and divert the internal arc in a direction away from such structures and equipment. Accordingly, arrester 10 is installed such that the outlets 62 in liner 42 face in a direction opposite to that of nearby electrical equipment or structures. Installed in this manner, directional outlets 62 vent the gas generated within a failed arrester away from the nearby equipment or structures to ensure that the exposed arc does not damage the equipment or structures. It is generally desirable that line and ground leads 22, 26, outlet 62 and weakened-wall regions 64 are positioned such that all lie in the same plane so that the ionized gas generated during a failure is vented from the arrester 10 between line lead 22 and ground lead 26 so as to create the shortest path to ground for the arc.

Figure 3A:
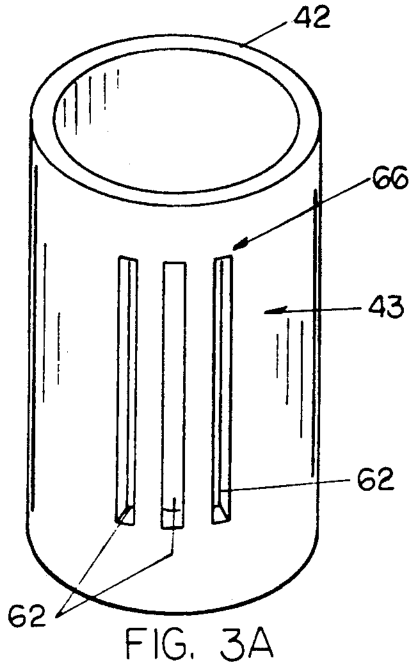
FIGS. 3A and 3B show perspective views of alternative embodiments of the subassembly liner shown in FIG. 3.
Figure 3:
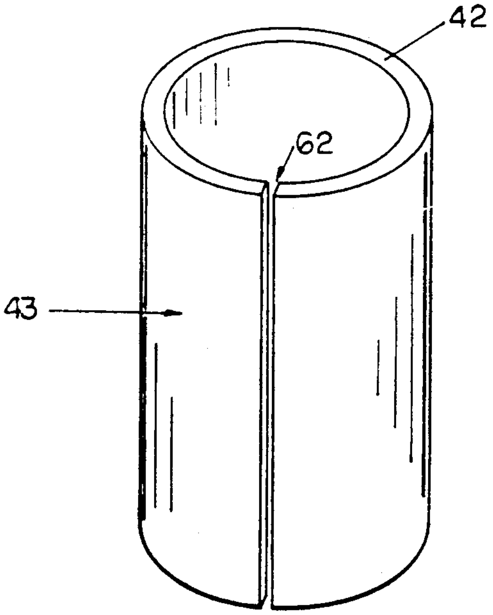
FIG. 3 shows a perspective view of the subassembly liner of the surge arrester shown in FIG. 1.
Figure 3B:
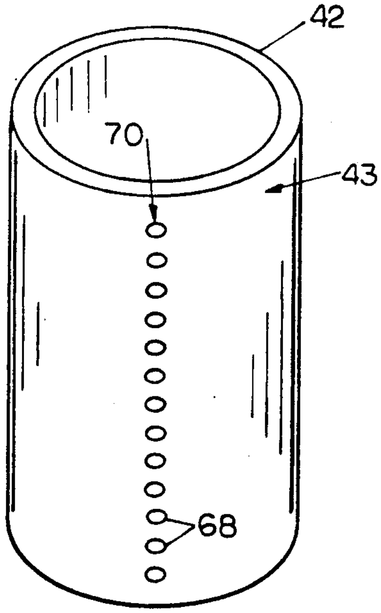
Figure 4:
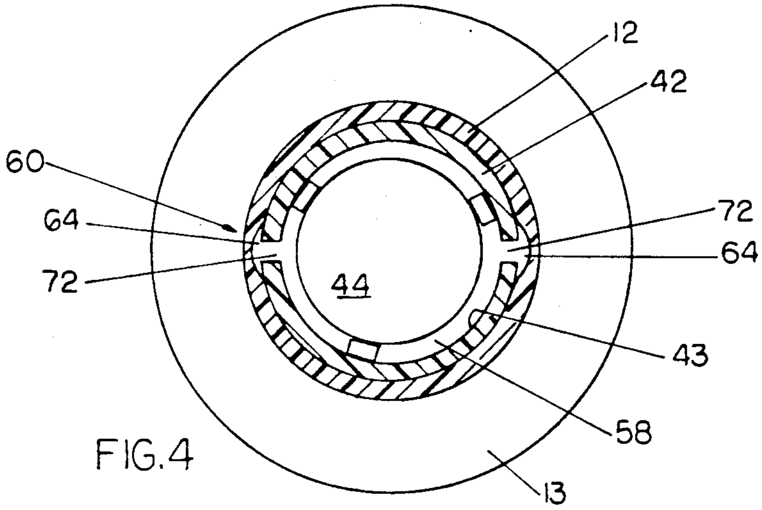
FIG. 4 shows, in cross section, an alternative embodiment the surge arrester shown in FIG. 1.

An alternative embodiment of liner 42 and pressure relief means 60 is depicted in FIG. 3A in which an array 66 of outlets 62 is shown formed within an arcuate segment of liner 42. Like the single elongate outlet 62 shown in FIG. 3, array 66 also provides directional control for transferring the arc outside the arrester and away from nearby equipment and the like. While it is not important to the operation of the arrester 10 that the outlet 62 extend the entire length of the liner 42 as shown in FIG. 3, this design may be more easily manufactured than that of FIG. 3A where the length of outlets 62 is matched to the height of the varistor element stack. Another alternative embodiment of liner 42 and pressure relief means 60 is shown in FIG. 3B. In this embodiment, pressure relief means 60 comprises a plurality of aligned perforations or apertures 68 formed in a row 70 parallel to the axis of liner 42. In the embodiments depicted in FIGS. 3A and 3B, the weakened-wall segments 64 of housing 12 would be positioned adjacent to array 66 and row 70, respectively.

Where directional venting is not a requirement, a number of alternative embodiments of the present invention may be employed. Referring first to FIG. 4, there is shown one such alternative embodiment in which liner 42 is manufactured with two slots 72 formed through walls 43 at locations 180 degrees apart. In this embodiment, housing 12 is formed and positioned about subassembly 40 with aligned rows of weakened-wall regions 64 adjacent to each slot 72. It is of course understood that a variety of other configurations of outlets 64 could be employed. For example, three slots 72 could be provided in liner 42 at locations 120 degrees apart, each slot 72 being positioned adjacent to a corresponding set of weakened-wall regions 64 formed in housing 12. Similarly, as shown in FIG. 5, a number of rows 70 of apertures 68 may be formed in walls 43 of liner 42, each row 70 being positioned adjacent to an aligned set of weakened-wall regions 64 in housing 12, six such sets spaced 60 degrees apart being depicted in FIG. 5.

Figure 6:
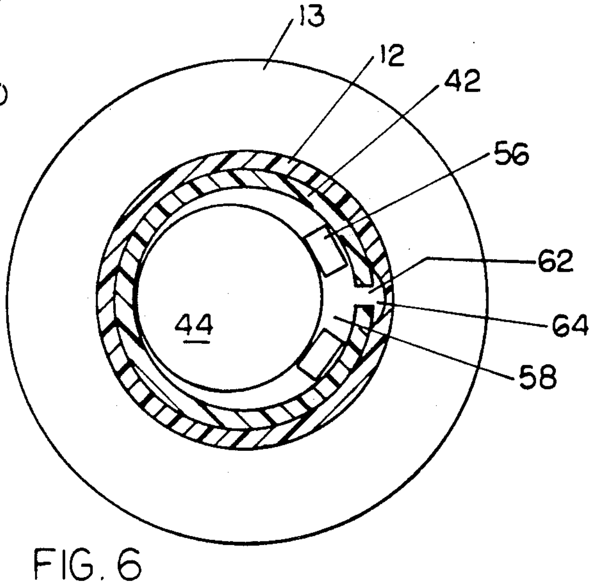
FIG. 6 shows, in cross section, another alternative embodiment of the surge arrester shown in FIG. 1.

Referring now to FIG. 6, there is depicted another embodiment of the present invention which provides directional control of the transferred arc. In this embodiment, varistors 44 are themselves coaxially aligned but are stacked in an eccentric alignment within liner 42 and retained in this acentric or offset position by insulative standoffs 56 such that the greatest volume of annular chamber 58 is adjacent to weakened-wall segments 64 in housing 12. In this configuration, the gap between varisters 44 and the walls 43 of liner 42 would approximate 1/2 inch at the point nearest outlet 62. It is contemplated that this configuration would provide a highly reliable degree of directional control.

Figure 5:
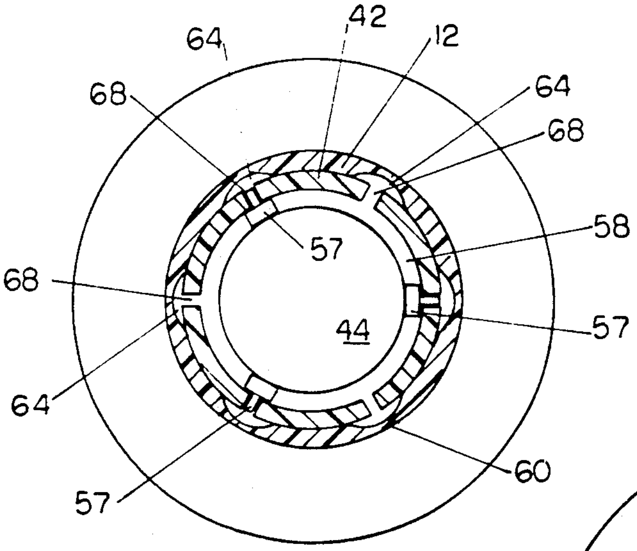
FIG. 5 shows, in cross section, another alternative embodiment of the surge arrester shown in FIG. 1.

An alternative means for retaining varistors 44 in liner 42 is depicted in FIG. 5. As shown, insulative standoffs 56 may comprise pins or rivets 57 made of nylon or other insulative, material. When rivets 57 are employed to maintain the desired separation between varistors 44 and liner 42, the rivets 57 are positioned within apertures 68 shown in FIG. 5 and FIG. 3B at the interface between adjacent varistor blocks 44. It should be understood that rivets 57 may likewise be employed with the liner 42 depicted in FIGS. 3 and 3A, rivet 57 then being fitted through slots 72 formed therein.

While the preferred embodiment of this invention has been shown and described, modifications thereof can be made by one skilled in the art without departing from the spirit of the invention. The embodiments described herein are exemplary only and are not limiting. Many variations and modifications of the system and apparatus are possible and are within the scope of the invention. Accordingly, the scope of protection is not limited by the above description, but is only limited by the claims which follow, that scope including all equivalents of the subject matter of the claims.

What is claimed is:

1. An electrical assembly for retaining a plurality of electrical components in electrical connection between a voltage and ground, comprising:

a liner for containing said electrical components;

an insulative housing having side walls enclosing said liner; and means for venting gas through said liner and through said side walls of said housing.

2. The electrical assembly of claim 1 wherein said venting means comprises at least one outlet formed in said liner.

3. The electrical assembly of claim 1 wherein said venting means comprises at least one weakened-wall region formed in said side walls of said housing.

4. An electrical assembly for retaining a plurality of electrical components in electrical connection between a voltage and ground, comprising:

a liner for containing said electrical components;

an insulative housing enclosing said liner; and means for venting gas through said liner and said housing wherein said venting means comprises at least one outlet formed in said liner and at least one weakened-wall region formed within said housing.

5. The electrical assembly of claim 4 wherein said weakened-wall region is positioned adjacent to said outlet.

6. The electrical assembly of claim 1 wherein said venting means further comprises a chamber formed between the electrical components and said liner for reducing the pressure shock on said liner upon generation of gas within the liner.

7. The electrical assembly of claim 1 wherein said housing includes spaced-apart ribs formed on the outside of said housing and spaced along the length of said housing, said weakened-wall regions being formed between said ribs.

8. A surge arrester comprising:

a plurality of electrical components for electrical connection between a voltage and ground;

an insulative liner for containing said electrical components;

means for relieving pressure within said liner upon the generation of gas within said liner;

an insulative housing having side walls enclosing said liner; and wherein said pressure relieving means comprises means for venting gas through said liner and through said side walls of said housing.

9. The surge arrester of claim 8 wherein said pressure relief means comprises at least one outlet formed in the wall of said liner.

10. A surge arrester comprising:

a plurality of electrical components for electrical connection between a voltage and ground;

an insulative liner for containing said electrical components;

means for relieving pressure within said liner upon the generation of gas within said liner;

an insulative housing enclosing said liner;

wherein said pressure relief means comprises at least one outlet formed in the wall of said liner and wherein said housing includes a plurality of weakened-wall segments formed therein.

11. The surge arrester of claim 10 wherein said weakenedwall segments are formed in the sides of said housing.

12. The surge arrester of claim 9 wherein said housing includes at least one weakened-wall segment adjacent to one of said outlets.

13. The surge arrester of claim 12 wherein said housing includes a plurality of spaced-apart ribs formed on the outside of said housing and spaced along length of said housing and includes a plurality of weakened-wall segments formed between said ribs.

14. The surge arrester of claim 13 wherein said weakenedwall segments in said housing are aligned.

15. The surge arrester of claim 13 wherein said outlet comprises at least one elongate slot and wherein said weakenedwall segments in said housing are adjacent to said elongate slot.

16. The surge arrester of claim 11 wherein said weakenedwall segments comprise a longitudinal channel in said housing.

17. A surge arrester comprising:

an elastomeric and insulative housing having side walls;

an enclosrue including insulative walls, said enclosure hermetically sealed from the ambient environment by said housing;

a plurality of voltage dependent non-linear resistive elements retained within said enclosure;

means within said enclosure for retaining said resistive elements in a spaced-apart relationship from said walls of said enclosure, the surfaces of said resistive elements and said walls of said enclosure defining a chamber therebetween; and means for relieving pressure within said enclosrue and said housing, said pressure relieving means comprising means for venting gas through said enclosure and through the side walls of said housing.

18. The surge arrester of claim 17 wherein said venting means comprises at least one outlet formed in said wall of said enclosure.

19. The surge arrester of claim 18 wherein said outlet comprises at least one longitudinal slot.

20. The surge arrester of claim 18 wherein said outlet comprises at least one longitudinal row of perforations.

21. The surge arrester of claim 18 wherein said housing includes at least one weakened-wall region formed adjacent to said outlet.

22. The surge arrester of claim 21 wherein said housing includes spaced-apart ribs formed on the outside of said housing and spaced along the length of said housing and further includes a plurality of weakened-wall regions formed between said ribs.

23. The surge arrester of claim 22 wherein said weakenedwall regions in said housing are aligned.

24. The surge arrester of claim 21 wherein said weakenedwall region comprises a longitudinal channel in said housing adjacent to said outlet.

25. An electrical subassembly, comprising:

a plurality of electrical components for connection between a voltage and ground;

an insulative liner for retaining said electrical components therein;

means within said liner for retaining said electrical components in a spaced-apart relationship from said liner, the surfaces of said electrical components and said liner defining a chamber therebetween; and an insulative housing covering said liner, said housing having at least one thin-walled region formed in the side wall thereof.

26. The electrical assembly of claim 25 wherein said retaining means comprises a plurality of insulative standoffs disposed between said electrical components and said liner.

27. The electrical assembly of claim 26 wherein said liner includes at least one outlet formed therein for venting gas through said liner.

28. The assembly of claim 27 wherein said electrical components, said chamber, and said liner are coaxially aligned.

29. The electrical assembly of claim 27 wherein said electrical components are coaxially aligned forming a stack of components and wherein said stack of components is retained within said liner in an eccentric position.

30. An enclosure for electrical components, comprising:

a liner of insulative material for retaining electrical components therein, said liner including one or more outlets in the walls thereof for venting gases therethrough; and an insulative housing enclosing said liner, said insulative housing having one or more weakened-wall segments formed in the side of said housing.

31. The enclosure of claim 30 wherein at least one of said weakened-wall segments is formed adjacent to one of said outlets.

32. The enclosure of claim 30 further comprising a plurality of ribs formed about the outside of said housing and spaced apart along the length of said housing wherein said weakened-wall segments are formed between said spaced-apart ribs.

33. The enclosure of claim 32 wherein at least one of said weakened-wall regions is formed adjacent to one of said outlets.

34. The enclosure of claim 33 wherein said housing is formed of an elastomeric material.

35. The enclosure of claim 32 wherein said weakened-wall segments are aligned.

36. An electrical assembly for retaining a plurality of electrical components therein, comprising:

an insulative liner;

an insulative housing covering said liner;

means for venting gas from the assembly in a predetermined direction through said liner and the side of said housing.

37. The electrical assembly of claim 36 wherein said venting means comprises at least one weakened-wall segment formed in the side of said housing and at least one outlet formed in said liner adjacent to said weakened-wall segment.

38. The electrical assembly of claim 37 wherein said outlet comprises a plurality of slots.

39. The electrical assembly of claim 37 wherein said outlet comprises a plurality of perforations.

40. The electrical assembly of claim 37 wherein said outlet comprises a plurality of rows of aligned perforations.

41. The electrical assembly of claim 37 wherein said outlet comprises an array of slots formed within an arcuate segment of said liner.

42. The electrical assembly of claim 37 wherein said weakened-wall segment comprises a longitudinal channel.

43. The electrical assembly of claim 37 wherein said housing includes a plurality of spaced apart ribs formed on the outside of said housing, said weakened-wall segments being formed between said ribs.

44. The electrical assembly of claim 37 further comprising a chamber formed between the electrical components and said liner for reducing the pressure shock on said liner upon generation of gas within said liner.

* * * * *